(12) United States Patent
Mann et al.

(10) Patent No.: US 12,209,665 B2
(45) Date of Patent: Jan. 28, 2025

(54) HIGH-PRESSURE RING GASKET FOR RING GROOVE INTERFACE IN FLANGED COMPONENTS

(71) Applicant: SPM Oil & Gas PC LLC, Houston, TX (US)

(72) Inventors: Michael L. Mann, Houston, TX (US); Ray Dicksang Pang, Missouri City, TX (US); Phu Duc Sy Dong, Houston, TX (US)

(73) Assignee: SPM Oil & Gas PC LLC, Fort Worth, TX (US)

( * ) Notice: Subject to any disclaimer, the term of this patent is extended or adjusted under 35 U.S.C. 154(b) by 257 days.

(21) Appl. No.: 17/735,054

(22) Filed: May 2, 2022

(65) Prior Publication Data

US 2022/0349471 A1 Nov. 3, 2022

Related U.S. Application Data

(60) Provisional application No. 63/183,582, filed on May 3, 2021.

(51) Int. Cl.
*F16J 15/10* (2006.01)
*F16J 15/02* (2006.01)

(52) U.S. Cl.
CPC .......... *F16J 15/104* (2013.01); *F16J 15/025* (2013.01)

(58) Field of Classification Search
CPC ........ F16J 15/025; F16J 15/061; F16J 15/062; F16J 15/104; F16L 23/18; F16L 23/22; F16L 17/073
See application file for complete search history.

(56) References Cited

U.S. PATENT DOCUMENTS

| 3,114,561 | A | * | 12/1963 | Creath | F16J 15/121 |
| | | | | | 277/626 |
| 3,223,426 | A | * | 12/1965 | Reid | F16J 15/121 |
| | | | | | 277/467 |
| 4,133,542 | A | * | 1/1979 | Janian | F16J 15/3212 |
| | | | | | 277/555 |
| 4,239,242 | A | * | 12/1980 | Burns | F16L 17/073 |
| | | | | | 285/379 |
| 4,585,239 | A | * | 4/1986 | Nicholson | F16J 15/3212 |
| | | | | | 277/570 |
| 4,974,821 | A | * | 12/1990 | Balsells | F16F 1/045 |
| | | | | | 267/167 |
| 5,316,320 | A | * | 5/1994 | Breaker | F16L 23/18 |
| | | | | | 285/368 |

(Continued)

FOREIGN PATENT DOCUMENTS

CN 210738515 U 6/2020

*Primary Examiner* — Nicholas L Foster

(57) ABSTRACT

An annular seal for installation in an annular groove defined at an interface between first and second wellhead component is disclosed. The seal has an annular body with first and second legs that define an annular channel at the inside diameter face of the annular body. The annular channel is configured to define a pressure cavity within the annular groove between the first and second wellhead component. The outside diameter face of the annular body has a tapered profile in cross-section, and the first and second legs have enlarged ends configured for engaging the inside diameter wall of the annular groove.

14 Claims, 5 Drawing Sheets

(56) References Cited

U.S. PATENT DOCUMENTS

| | | | |
|---|---|---|---|
| 5,564,715 A * | 10/1996 | Wallace | F16L 23/16 |
| | | | 277/627 |
| 5,630,591 A * | 5/1997 | Drijver | F16J 15/025 |
| | | | 277/553 |
| 5,799,953 A * | 9/1998 | Henderson | F16J 15/3236 |
| | | | 277/567 |
| 5,979,904 A * | 11/1999 | Balsells | F16J 15/3236 |
| | | | 277/575 |
| 7,740,080 B2 | 6/2010 | Fenton | |
| 7,976,074 B2 * | 7/2011 | Anderson | F16L 23/18 |
| | | | 285/364 |
| 8,678,398 B2 * | 3/2014 | Anderson | F16L 23/18 |
| | | | 277/611 |
| 9,120,261 B2 | 9/2015 | Hench | |
| 9,869,148 B2 | 1/2018 | Jahnke | |
| 9,976,680 B2 * | 5/2018 | Kramer | F16J 15/104 |
| 10,156,112 B2 | 12/2018 | Cotton | |
| 10,801,622 B2 * | 10/2020 | Foster | F16J 15/027 |
| 11,060,612 B2 * | 7/2021 | Lee | F16J 15/064 |
| 2009/0243290 A1 * | 10/2009 | Anderson | F16L 25/026 |
| | | | 285/329 |
| 2011/0266755 A1 * | 11/2011 | Anderson | F16L 25/026 |
| | | | 277/611 |
| 2014/0312570 A1 * | 10/2014 | Foster | F16L 17/035 |
| | | | 277/642 |
| 2015/0377394 A1 * | 12/2015 | Kramer | F16L 25/02 |
| | | | 277/616 |
| 2016/0298767 A1 | 10/2016 | Puccio | |
| 2021/0003218 A1 * | 1/2021 | Lee | F16J 15/122 |

* cited by examiner

HIGH-PRESSURE RING GASKET FOR RING GROOVE INTERFACE IN FLANGED COMPONENTS

RELATED APPLICATION

This patent application claims the benefit of U.S. Provisional Patent Application No. 63/183,582 filed on May 3, 2021, which is incorporated herein in its entirety by reference.

FIELD

The present disclosure relates to oil and gas well drilling and production, and in particular, to a high-pressure ring gasket for a ring groove interface in flanged equipment such as wellhead components.

BACKGROUND

Oil and Gas equipment used to drill, complete, or distribute petroleum type products are often subjected to high pressure and high temperature environments. Well fluids can have adverse impact on well equipment because of their extreme properties such as high temperatures (e.g., 1,000 degrees F.) and high pressures (e.g., up to 30,000 psi). Related piping and pressure containing equipment requires appropriate connections to contain and control these fluids. These connections typically include a flanged interface using a bolted connection with high make-up load to energize a pressure containing crush-style gasket.

DETAILED DESCRIPTION

Figure 1:
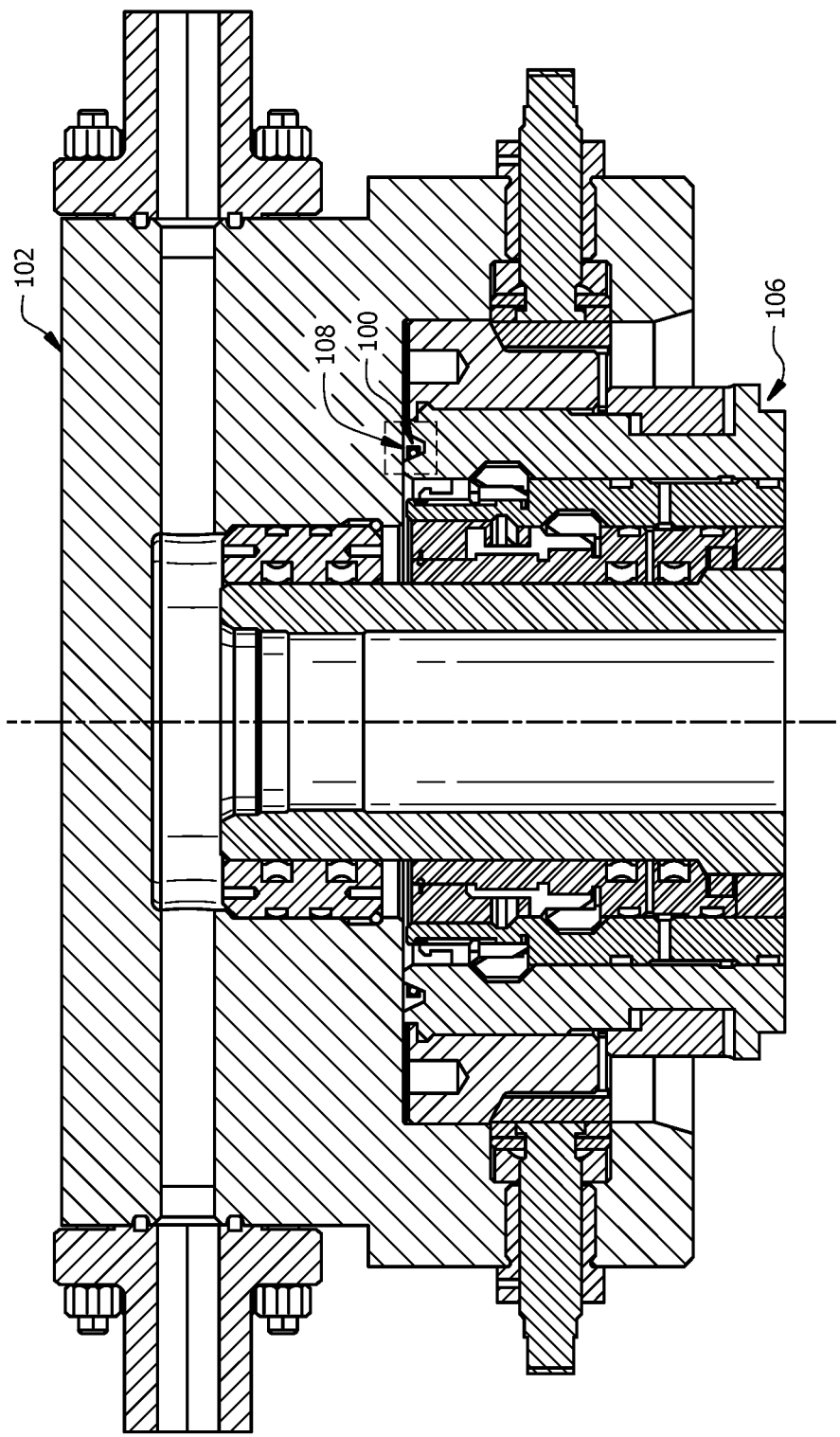
FIG. 1 is a cross-sectional side view of an exemplary embodiment of a pressure-energized ring seal for a wellhead connector according to the teachings of the present disclosure.
Figure 2:
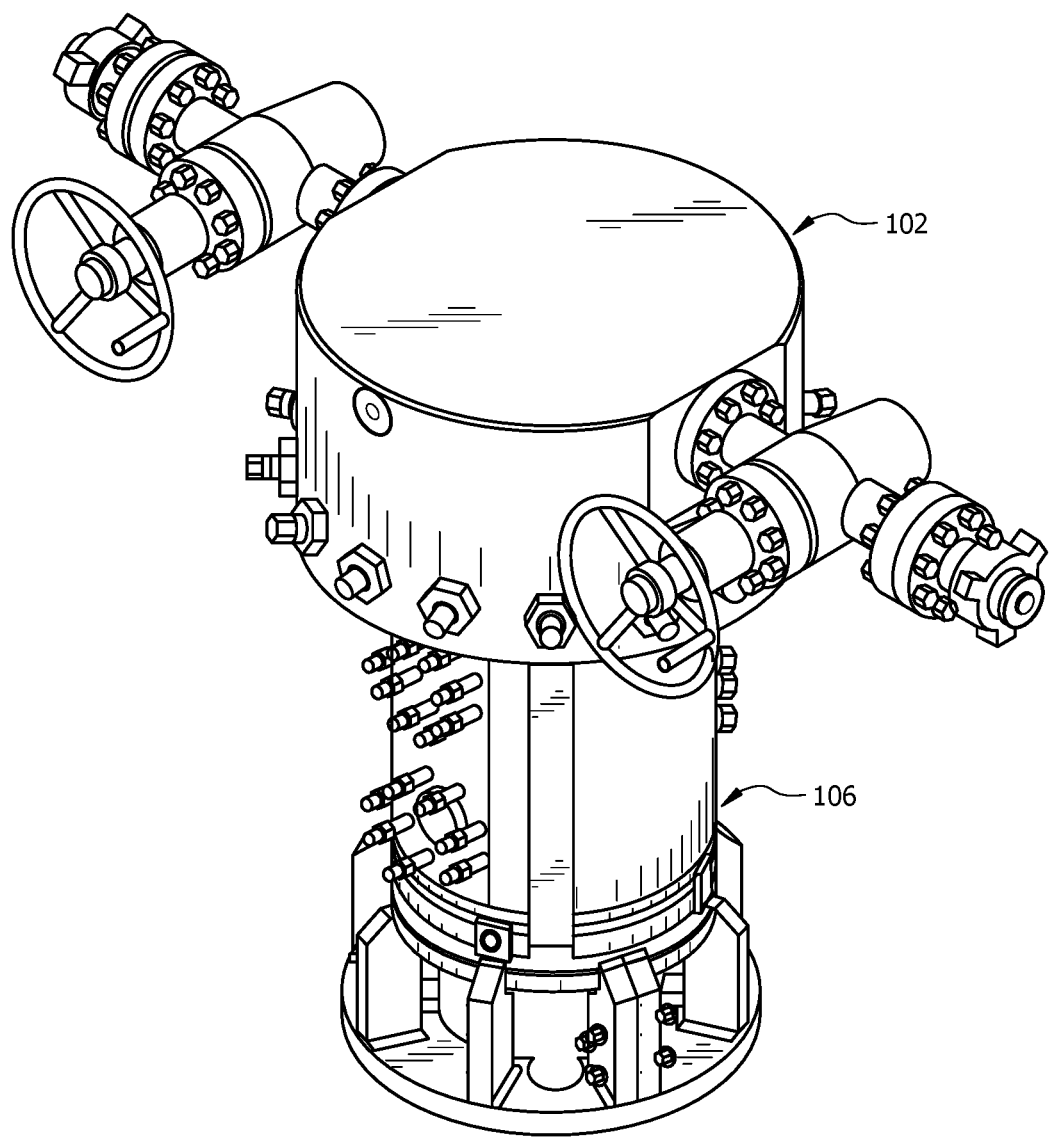
FIG. 2 is a perspective view of an exemplary embodiment of a quick wellhead connector employing a pressure-energized ring seal according to the teachings of the present disclosure.

Conventional wellhead connectors typically include a flanged interface secured by a plurality of bolts. The bolted connection provides a high make-up load to energize a pressure containing, crush-style gasket disposed within a ring groove formed in both flanged components at the interface. Typically, extreme torque is required to make up these high-pressure connections, e.g., 1,500 ft-lb. of torque may be required to make up a 10,000 psi 11" diameter flanged connection based on the actual bolt type and coatings used. Further, to achieve load uniformity, high torque cannot be applied to the bolts at once but must be made incrementally to each bolt in turn using a torque tool. The required amount of time to properly make up this high-pressure connection is excessive, perhaps 30 to 45 minutes depending on the number of technicians and the specific method used to perform the operation. Because many flanged connectors are needed to complete a single system at a wellhead, the total amount of time used to complete a full installation is time-consuming and costly, often in the tens of the thousands of dollars per well. Other means to make up these high-pressure connections cannot be used because these connections are often controlled with regulated standards such as API 6A and ASME/ANSI B16.5 that define the mechanical connection, i.e., the bolts and the sealing mechanism using a ring groove for a conventional crush-style gasket.

Referring to the various views shown in FIGS. 1-6, the unique pressure-energized seal 100 described herein is a unique seal 100 that can be used to interface with standard high-pressure flanged equipment 102 such as a wellhead connector used for a wellhead 106 that have two components that define tapered-wall ring grooves 108 (generally trapezoidal in shape with two tapered side walls and top and bottom sides in parallel when the two connector components are installed together, where the top side is generally longer than the lower side) but can be installed in a fraction amount of time, e.g., within 10% of the time required using traditional gaskets and torque loads.

Figure 3:
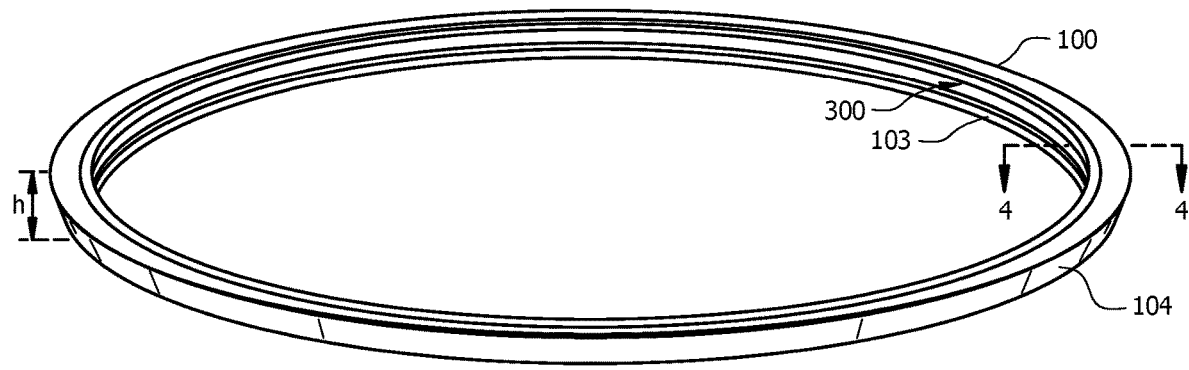
FIG. 3 is a perspective view of an exemplary embodiment of a pressure-energized ring seal for a wellhead connector according to the teachings of the present disclosure.
Figure 4:
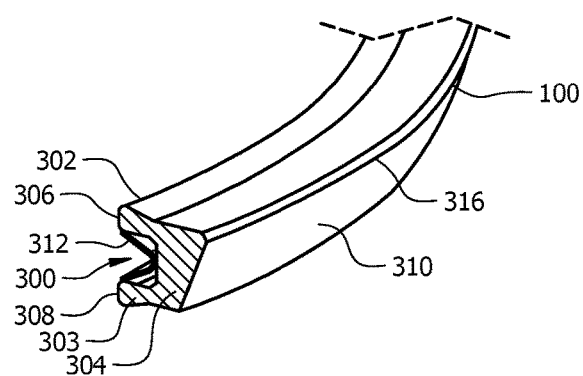
FIG. 4 is a cross-sectional view of an exemplary embodiment of a pressure-energized ring seal for a wellhead connector along line 4-4 in FIG. 3 according to the teachings of the present disclosure.

As shown in FIGS. 3 and 4, the seal 100 has an annular body with an outside diameter (OD) face 104 and inside diameter (ID) face 103. The annular seal 100 has an annular C-channel 300 along its entire inside diameter face 103 with an open cross-sectional profile that has two levers 302 and 303 (also referred to herein as lips, legs, or jaws) connected at a base 304, which has a tapered face. The top and bottom legs 302 and 303 extend generally horizontally to approximately the same vertical line (e.g., the top and bottom legs 302 and 303 having approximately the same inner diameter). Alternatively, the top leg 302 can extend beyond the bottom leg 303 (e.g., the top leg 302 having a lesser inner diameter than the bottom leg 303). The top and bottom legs have a radial length about equal to or longer than the radial width of the annular groove. The tip of each leg 302 and 303 has an enlarged tip or lip 306 and 308 (e.g., having a greater axial length, in a direction parallel to a center axis of the seal 100, relative to the respective leg 302 or 303). The height, h, of the overall dimensional envelope of the seal 100 is at least as deep as the standard ring groove of a flanged connector 102 intended for a crush-style gasket. The outside diameter face of the seal 100 includes a tapered side 310 that is intended to interface with the tapered wall of a standard ring groove intended for a crush-style gasket. The angle of the tapered outside diameter face 104 can be consistent with the angle of the tapered wall of the ring groove. A C-shaped spring 312 is disposed within the C-channel 300 of the ring seal 100 to provide an energizing load that enables the ring seal 100 to reach proper sealing at a lower pressure. The C-shaped spring 312 may have legs of equal of different lengths. For example, the top leg of the spring may be longer than the bottom leg of the spring, so that the shape of the spring 312 is consistent with the overall trapezoidal cross-section envelope of the annular groove. A chamfered corner 316 is further defined at the outside diameter face of the ring seal 100 to provide a reaction point to hold the seal and prevent twisting/torsion of the seal body.

The unique seal 100 may be fabricated from metallic or non-metallic materials such as 316 stainless steel, soft nickel chrome, and Polytetrafluoroethylene (PTFE).

Figure 5:
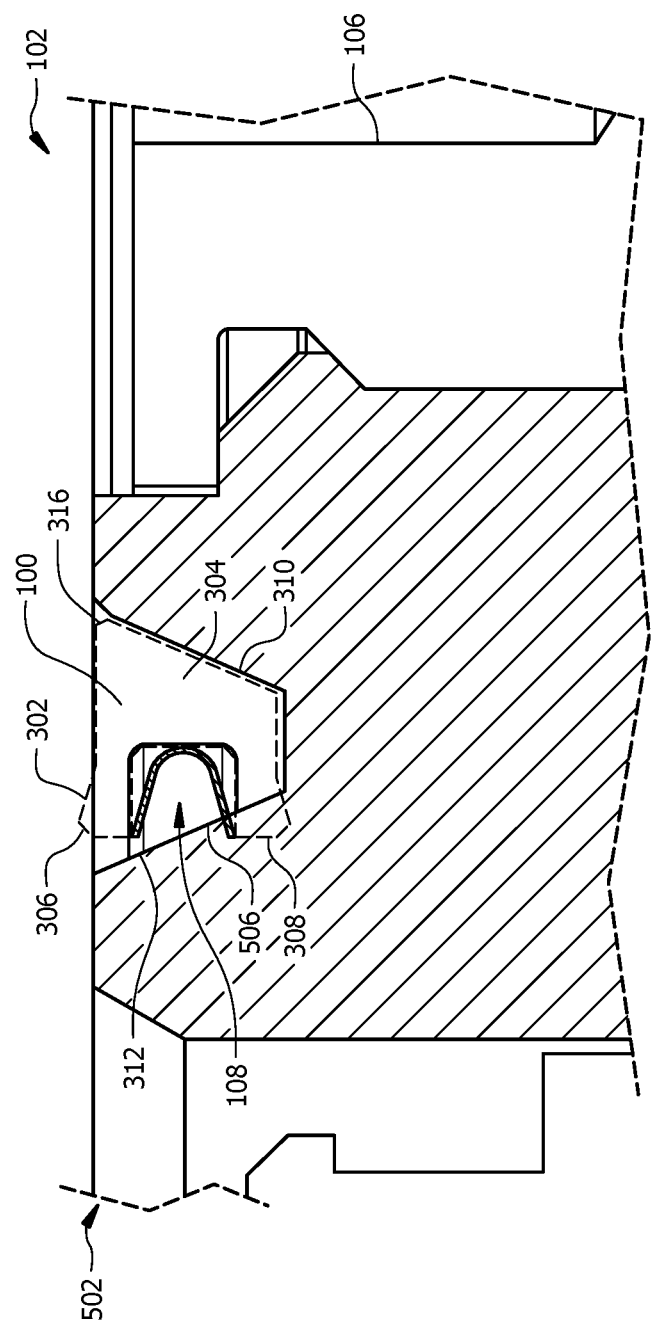
FIG. 5 is a more detailed close-up cross-sectional view of an exemplary embodiment of a pressure-energized ring seal for a wellhead connector according to the teachings of the present disclosure.

FIG. 5 is a cross-sectional view of the ring seal 100 shown with a natural (e.g., relaxed) shape or silhouette in dashed line superimposed over a pressure-energized shape in solid line when disposed within a crush-style ring groove 108 defined at a planar interface 502 of a connector 102 for a wellhead 106. When the ring seal 100 is installed within the standard ring groove 108 in a wellhead component, the tapered outside diameter face 310 of the ring seal 100 coincides with the tapered wall of the ring groove 108. When the flanged connector 102 is brought together with the wellhead 106, the top leg 302 and top lip 306 of the seal 100 that extend above the planar surfaces 502 of the wellhead interface would be pushed down into the ring groove 108 by the planar surfaces 502 of the connector 102 and engage the tapered inside diameter side wall 506 of the ring groove 108. Similarly, the bottom leg 303 is also pressed firmly within the bottom surface of the ring groove 108. Both the top and bottom legs 302 and 303 becomes fully engaged with the tapered inside diameter wall 506 of the ring groove 108 when the connector 704 is properly situated or coupled to the wellhead 106. The C-channel 300 defined between the top leg 302 and the bottom leg 303 defines a pressure cavity within the ring groove 108 between the flanged connector 102 and the wellhead 106. The chamfered corner 316 defined at the outside diameter face of the ring seal 100 is situated proximate the interface between the connector 102 and wellhead 106.

Figure 6:
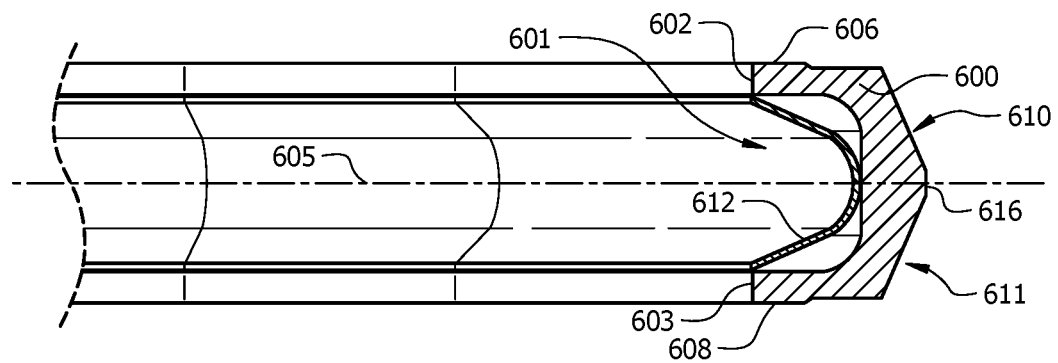
FIG. 6 is a more detailed close-up cross-sectional view of an exemplary embodiment of a pressure-energized ring seal for a mirrored ring groove defined at an interface between a connector and a wellhead equipment according to the teachings of the present disclosure.

FIG. 6 is a detailed cross-sectional view of another embodiment of a pressure-energized annular seal 600 for installation in a mirrored hexagonal cross-section ring groove 700 that has symmetrical upper and lower portions (see FIG. 7) defined in the well equipment. The unique profile of the annular seal 600 includes a C-channel 601 along its entire inside diameter face with an open cross-sectional profile that has two levers 602 and 603 (also referred to herein as lips, legs or jaws) connected at a base 604, which is tapered. The seal 600 is generally symmetrical along a horizontal axis 605 that bisects the body of the seal 600 into upper and lower portions. The two legs 602 and 603 extend generally horizontally to approximately the same vertical line and are generally symmetrical. The top and bottom legs have a radial length about equal to or longer than the radial width of the annular groove. The tip of each leg 602 and 603 has an enlarged tip or lip 606 and 608. The seal 600 has an annular body with an outside diameter (OD) face and inside diameter (ID) face. The outside diameter face of the seal 600 includes a tapered top side 610 and a tapered bottom side 611. A C-shaped spring 612 is disposed within the C-channel 601 of the ring seal 600 to provide an energizing load that enables the ring seal 600 to reach proper sealing at a lower pressure. A chamfered corner 616 is further defined at the outside diameter corner where the tapered top side 610 connects to the tapered bottom side 611.

Figure 7:
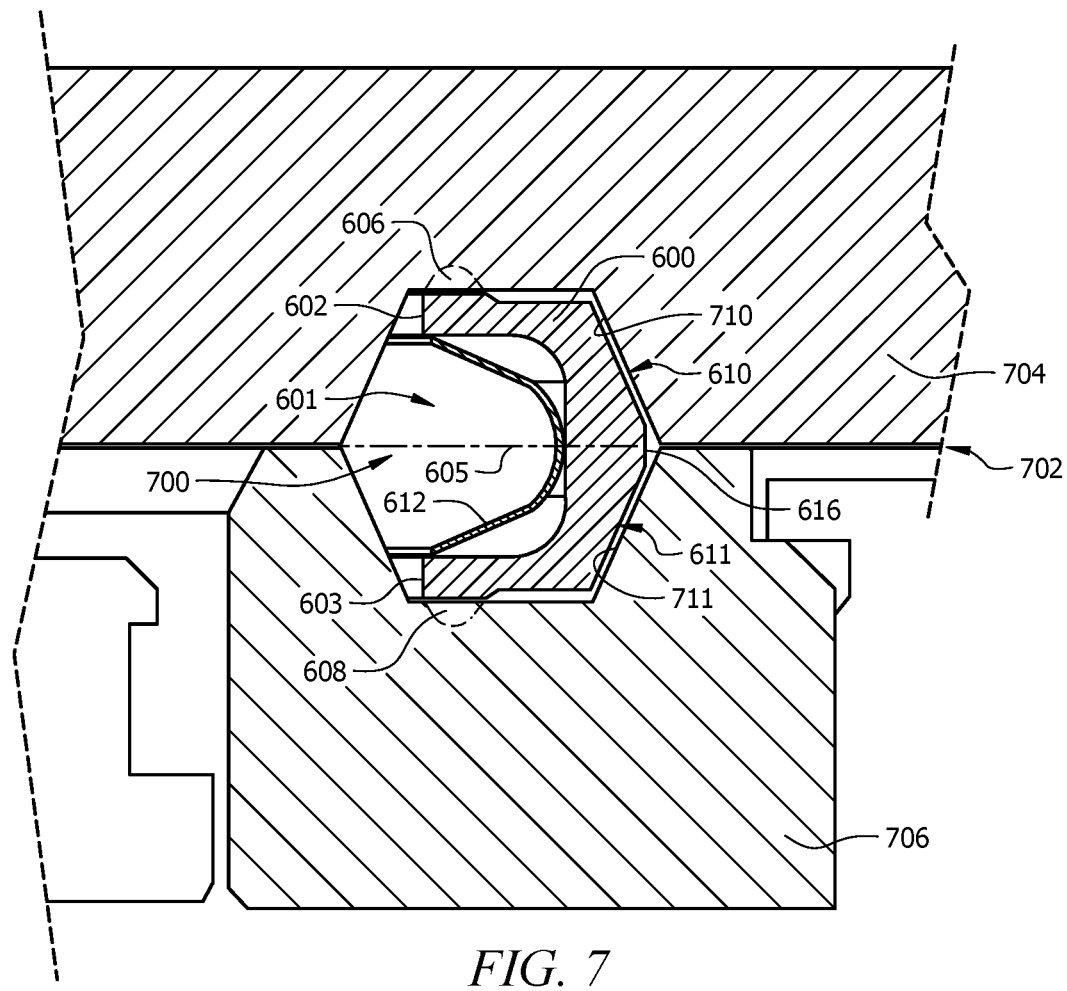
FIG. 7 is a more detailed close-up cross-sectional view of an exemplary embodiment of a pressure-energized ring seal installed within a mirrored ring groove defined at an interface between a connector and a wellhead equipment according to the teachings of the present disclosure.

FIG. 7 is a detailed cross-sectional view of the annular seal 600 shown with a natural (e.g., relaxed) shape or silhouette in dashed line superimposed over a pressure-energized shape in solid line when disposed within a hexagonal groove 700 defined at an interface 702 of a connector 704 for a wellhead 706. The angle of the tapered top side 610 can be consistent with the angle of the tapered top wall 710 of the ring groove, and the angle of the tapered bottom side 611 can be consistent with the angle of the tapered bottom wall 711 of the ring groove. When disposed within the ring groove 700, the outward extending legs 602 and 603 of the seal 600 and the C-shaped spring 612 become tightly contained within the confines of the walls of the groove 700. In this embodiment, the ring seal 600 has a height that substantially spans the depth of the hexagonally-shaped groove 700 or exceeds it. The accompanying C-shaped (or U-shaped) spring 612 disposed within the C-channel 601 of the seal 600 also has a height that spans the C-channel 601 defined by the annular body of the seal 600. It may be seen that the upper and lower halves of the annular body of the seal 600 is substantially symmetrical. The annular seal body has a cross-section that is generally C-shaped with two legs or jaws 602 and 603 that have protruding or enlarged lips 606 and 608 at the tips of the legs. The outside diameter face of the annular seal body is tapered in a manner consistent with the tapered outside diameter walls of the hexagonal groove. The chamfered corner 616 is further defined at the center of the outside diameter face of the seal body. The chamfered corner 616 provides a reaction point to hold the seal and prevent twisting/torsion of the annular body of the seal.

Whereas traditional crush-style gaskets used with ring grooves require high loads to create the proper seal due to the "crush" effect between the seal and ring groove geometry, the new seal has a mating outside diameter profile similar to the hexagonal ring groove configuration, so that it can become properly positioned and energized with a very small load, e.g., 1,000 lb., which is about a 90% reduction compared to conventional crush-style gaskets for this type of connection. Because the seal is not closed, but has an open C-configuration, the energizing effect that seals the connection is amplified as a function of cavity pressure and thereby prevents pressure from escaping from outside of the pressure boundary.

Because the geometry of the ring seal can fit within legacy crush-style ring grooves, the legacy equipment do not need to be modified at costly expense. Importantly the new seal is applicable to existing field inventory without modifications. Lastly, although the mating connector could have a mirrored ring groove as with the body it is mating with, it is advantageous to employ a connector with a flat/planar surface without a ring groove because a standard connector body may be used to interface with and accommodate mating bodies that have different diameter seal grooves.

One advantage of the new ring seal described herein includes its suitability to interface with existing wellhead equipment that uses standard ring grooves for crush gasket so that no costly modification to legacy wellhead equipment is needed. Another advantage of the new ring gasket is that only low load in the range of about 5,000 pounds is required instead of a high load of about 1.2 million pounds for the high-pressure wellhead application (15,000 psi). Further, the new ring gasket will not be compromised by over-torquing of the bolts to create the preload (force load from bolts in picture) because a connector with a planar interface profile can be used, which would rest on top of the ring groove face and provide a positive stop for energizing the seal. This means that the new ring seal cannot be "over crushed" if the bolts are over tightened. Yet another advantage is that the function of the bolts to provide preload for holding high pressure is decoupled from their function of maintaining the cap pressure end load. This means that the bolts will only now need to engage the segments on the wellhead to hold the connector body onto its mating body when exposed to pressure end load. The new seal design will maintain the pressure and prevent leaks to atmosphere. Further, bolts are known to lose preload over time and often have to be re-torqued to apply sufficient load on a crush-gasket to maintain a seal. With this new design, the bolts will not be required to be re-torqued to maintain the seal since they are no longer used for that purpose.

It should be noted that the profile of the ring gasket may be shaped differently than those shown herein, and can be modified to be consistent with the shape of the ring groove.

The features of the present invention which are believed to be novel are set forth below with particularity in the appended claims. However, modifications, variations, and changes to the exemplary embodiments described above will be apparent to those skilled in the art, and the unique pressure-energized ring seal for a wellhead connector described herein thus encompasses such modifications, variations, and changes and are not limited to the specific embodiments described herein.

What is claimed is:

1. An annular seal for installation in an annular groove defined at an interface between first and second wellhead components, the annular seal comprising:
   an annular body having an inside diameter face and an outside diameter face, the annular body having a first leg having a top surface and a second leg having a lower surface, the first and second legs further including an inner surface defining an annular channel at the inside diameter face of the annular body, the annular channel being configured to define a pressure cavity within the annular groove between the first and second wellhead components;
   the outside diameter face of the annular body having a tapered profile in cross-section; and
   the first and second legs having enlarged ends, the enlarged ends extending from the top surface of the first leg and extending from the lower surface of the second leg and configured for engaging an inside diameter wall of the annular groove, the enlarged ends having a greater axial length than an axial length of the first and second legs in a direction parallel to a center axis of the annular seal.

2. The annular seal of claim 1, further comprising an annular C-shaped spring disposed within the annular channel of the annular body.

3. The annular seal of claim 1, wherein the first leg of the annular body has a radial length, prior to installation in the annular groove, about equal to or longer than a corresponding radial width of the annular groove.

4. The annular seal of claim 1, wherein the annular body has a height, prior to installation in the annular groove, equal to or greater than a depth of the annular groove.

5. The annular seal of claim 1, wherein, when the annular seal is installed in the annular groove, the first and second legs of the annular body have unequal lengths.

6. The annular seal of claim 1, wherein the first and second legs of the annular body have equal lengths.

7. The annular seal of claim 1, wherein the tapered profile of the annular body includes a chamfered corner configured to be disposed at the interface between the first and second wellhead components.

8. An annular seal for installation in an annular groove defined at an interface between first and second wellhead components, the annular seal comprising:
   an annular body having an inside diameter face and an outside diameter face, the annular body having first and second legs extending from the outside diameter face to the inside diameter face, the first leg having a top surface and the second leg having a lower surface, the first and second legs having an inner surface defining an annular channel therebetween, the annular channel defining an opening at the inside diameter face of the annular body;
   the first and second legs having enlarged ends, the enlarged ends extending from the top surface of the first leg and extending from the lower surface of the second leg and configured for engaging an inside diameter wall of the annular groove, the enlarged ends having a greater axial length than an axial length of the first and second legs in a direction parallel to a center axis of the annular seal;
   the outside diameter face of the annular body having a tapered profile, prior to installation in the annular groove, consistent with a tapered profile of an outside diameter wall of the annular groove; and
   the tapered profile of the outside diameter face of the annular body having a chamfered corner.

9. The annular seal of claim 8, further comprising an annular C-shaped spring disposed within the annular channel of the annular body.

10. The annular seal of claim 8, wherein, when the annular seal is installed in the annular groove, the first and second legs of the annular body have a length, prior to installation in the annular groove, corresponding to a width of the annular groove.

11. The annular seal of claim 10, wherein, when the annular seal is installed in the annular groove, the first and second legs of the annular body have unequal lengths.

12. An annular seal for installation in a crush-style annular groove disposed at an interface between first and second flanged wellhead components, the annular seal comprising:
   an annular body having an inside diameter face and an outside diameter face, the annular body defining an annular channel open at the inside diameter face of the annular body, the annular channel configured to form a pressure cavity within the annular groove when the first and second flanged wellhead components are aligned to enclose the annular seal within the annular groove, the annular body having first and second legs, the first leg having a top surface and the second leg having a lower surface, the first and second legs further including an inner surface defining an annular channel at the inside diameter face of the annular body;
   the first and second legs having enlarged ends, the enlarged ends extending from the top surface of the first leg and extending from the lower surface of the second leg, the enlarged ends having a greater axial length than an axial length of the first and second legs in a direction parallel to a center axis of the annular seal;
   the outside diameter face of the annular body having a profile, prior to installation in the annular groove, corresponding to a profile of an outside diameter wall of the annular groove, the profile of the outside diameter face of the annular body having a chamfered corner; and
   the inside diameter face of the annular body having a profile that facilitates formation of the pressure cavity within the annular groove.

13. The annular seal of claim 12, further comprising an annular spring having a C-shaped cross-section disposed within the annular channel.

14. The annular seal of claim 12, wherein respective shapes of the inside and outside diameter faces of the annular body, prior to installation in the annular groove, correspond to an inside diameter wall and the outside diameter wall of the annular groove.

\* \* \* \* \*